United States Patent [19]
Foreman

[11] Patent Number: 5,443,293
[45] Date of Patent: Aug. 22, 1995

[54] SPATULA FOR USAGE WITH FRYING GRILLS

[76] Inventor: Larry W. Foreman, 3947 W St., Omaha, Nebr. 68107

[21] Appl. No.: 274,035

[22] Filed: Jul. 12, 1994

[51] Int. Cl.$^6$ ............................................. A47J 43/28
[52] U.S. Cl. ...................................................... 294/7
[58] Field of Search .................. 294/7, 8, 26.5, 32, 294/49, 55; 7/110, 113; 15/236.01, 236.05; 99/393–395, 397, 402, 409, 644; 209/418, 419

[56] References Cited

U.S. PATENT DOCUMENTS

| | | | |
|---|---|---|---|
| 71,969 | 12/1867 | Brooks | 209/419 |
| 761,014 | 5/1904 | Shupe | 99/394 |
| 1,076,383 | 10/1913 | Mendez | 99/394 X |
| 2,526,275 | 10/1950 | Roberts | 294/7 |
| 2,551,877 | 5/1951 | Ditto | 294/7 |
| 2,567,091 | 9/1951 | Whitnah et al. | 294/7 |
| 2,681,001 | 6/1954 | Smith | 99/402 |
| 4,088,360 | 5/1978 | Jenkins et al. | 294/8 |
| 4,095,832 | 6/1978 | Slinker | 294/8 |
| 4,205,870 | 6/1980 | Conner | 294/7 |

FOREIGN PATENT DOCUMENTS 125849 of 1919 United Kingdom ................... 294/7

Primary Examiner—Johnny D. Cherry
Attorney, Agent, or Firm—George R. Nimmer

[57] ABSTRACT

Disclosed is an improved spatula concept for inverting, from a frying-grill or a frying-pan, of bottom-side-cooked yokes-intact (aka "sunnyside-up") frying-eggs, whereby the upper-side of "sunnyside-up" frying eggs can thereafter be cooked without yoke-fracture. The novel spatula disclosure has a horizontal upper-plate finitely overlying a rearwardly-handled and horizontal multi-perforate lower-plate so that (whenever there has occurred eggs bottom-side-cooking) there is then enabled yokes-intact cooking of the frying-eggs upper-side. The disclosed spatula also includes various ancillary features including, inter alia: optional porosity for the upper-plate; positioned between the upper-plate and lower-plate, an outwardly extending cutting-blade employable for sub-dividing yoke-intact regions of frying-eggs (including ambidextrous capability); various apt methods for attaching the upper-plate in upwardly-offset relationship to the multi-perforate lower-plate; and other herein disclosed optional spatula features for inverting yokes-intact frying-eggs from a frying-grill or frying-pan.

13 Claims, 2 Drawing Sheets

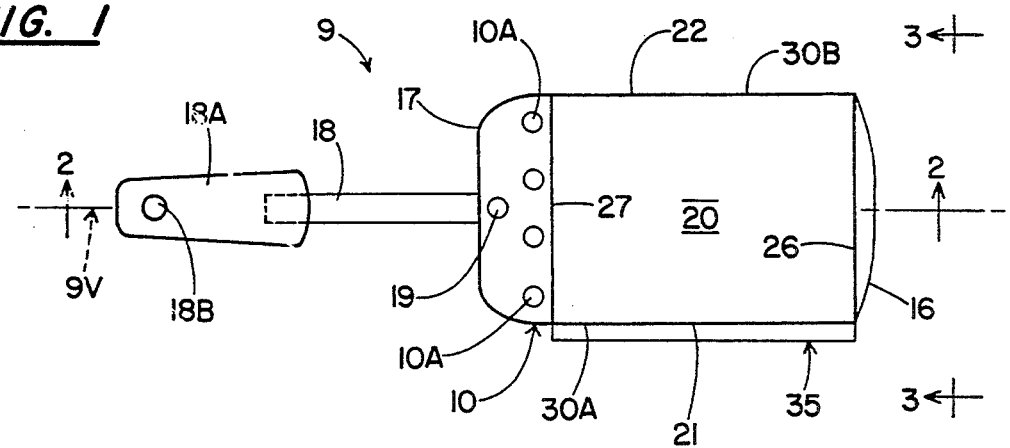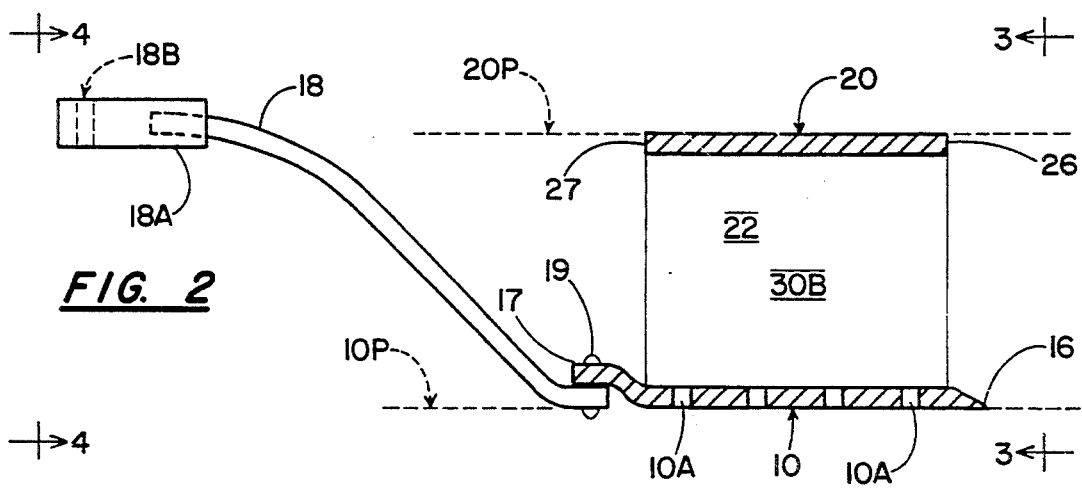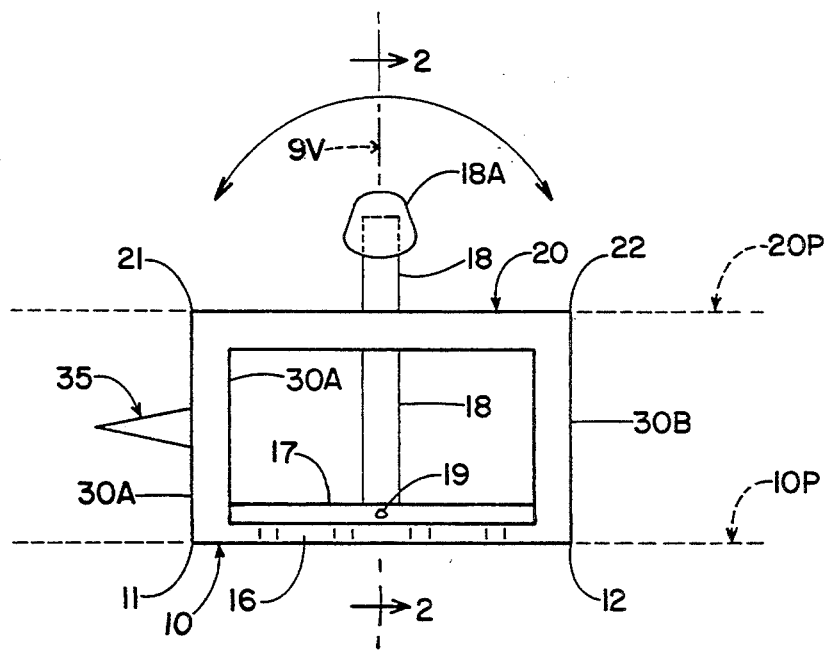

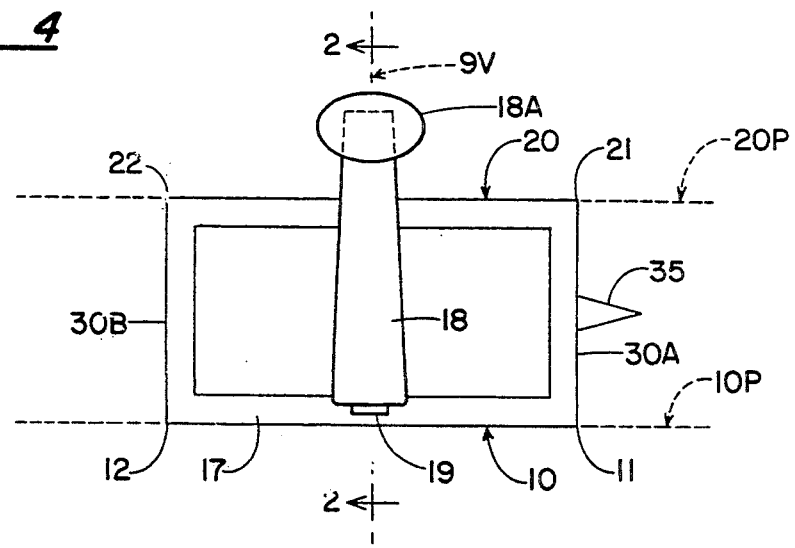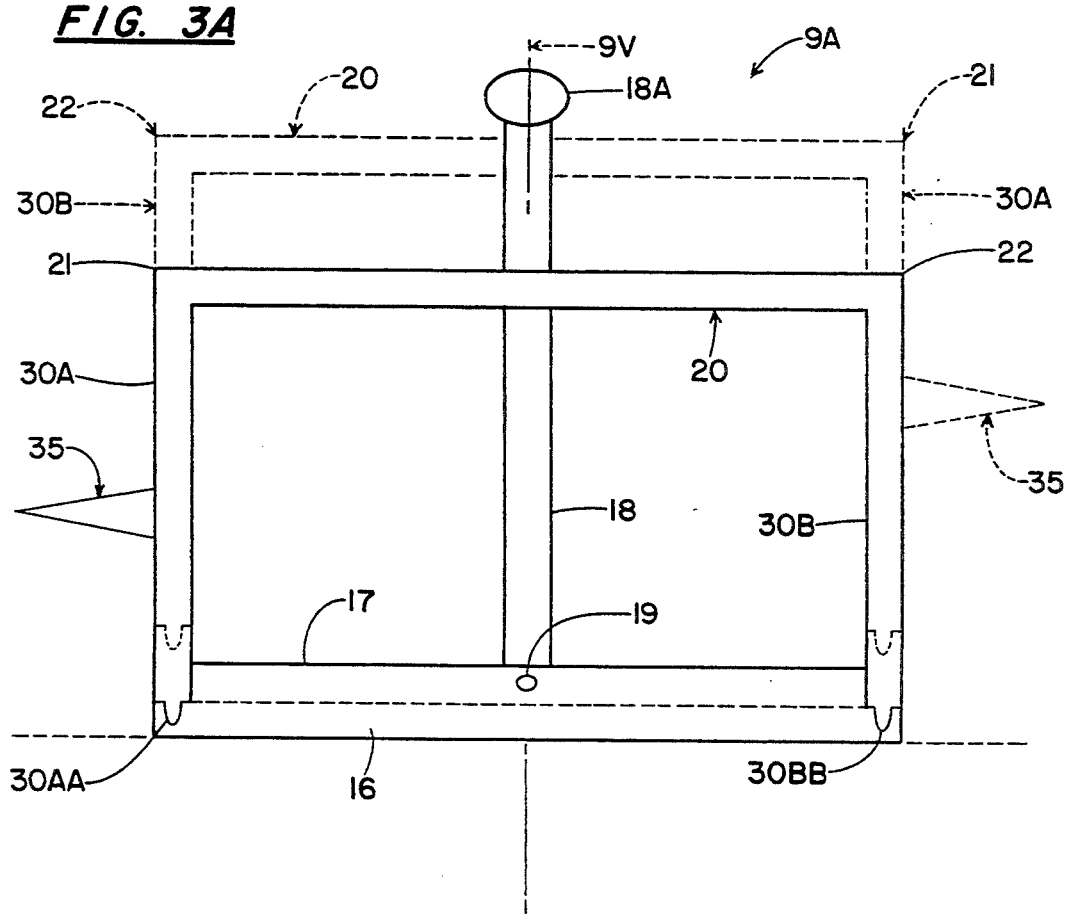

1

SPATULA FOR USAGE WITH FRYING GRILLS

BACKGROUND OF THE INVENTION

As indicated by the disclosures in U.S. Pat. Nos. 2,567,091 (1951), 4,088,360 (1978), and 4,095,832 (1978), prior culinary workers have sought spatula-type devices to address the vexatious problem of providing yokes-intact (aka "sunnyside-up") fried-eggs. The vexatious problem of providing yokes-intact sunnyside-up (eg yokes-intact) fried-eggs resides at that intermediate cooking stage wherein the frying-eggs have attained bottom-side- cooking, and thus, must then be inverted (without breaking the half-cooked egg yokes) onto the frying-grill for thence cooking the frying-eggs upperside. Prior art culinary workers' spatula-type devices have only partially solved this vexatious problem; moreover, prior art devices tend to be operationally cumbersome for usage in inverting the half-cooked frying eggs, are expensive to manufacture, are difficult to clean after usage, and are impractical for usage by restaurant and/or institutional chefs whenever the chef is suddenly confronted with a plurality of orders for sunnyside-up fried-eggs.

OBJECTIVES OF THE INVENTION

It is accordingly the general objective of the present invention, and toward the culinary quest of making yokes-intact sunnyside-up eggs, to provide an improved spatula-type device that satisfies this quest. Ancillary objectives include an improved spatula-type device that is: reliable for the intended purpose of making yokes-intact sunnyside-up eggs, of relatively simple and inexpensive manufacture, easy to clean after each usage, and adaptable even for restaurant and institutional usages wherein a randomly encountered chef is simultaneously confronted with numerous orders for yokes-intact sunny side-up eggs.

GENERAL STATEMENT OF THE INVENTION

With the above general and ancillary objectives in view, and together with other specific and related objectives which will become more apparent as this description proceeds, the "Spatula adapted for Inverting Frying-eggs" generally comprises, a multi-perforate horizontal lower-plate; an overlying horizontal upper-plate; a pair of offset upright plates connecting the lower-plate to the upper-plate; centrally attached to and extending rearwardly and upwardly from the lower-plate, a handle permitting manually-induced reciprocations and inversion of the spatula; and preferably also a horizontal cutting-blade enabling a restaurant or institutional chef to sub-divide simultaneous orders for yokes-intact sunnyside-up eggs.

BRIEF DESCRIPTION OF THE DRAWING

In the drawing, wherein like characters refer to like parts in the several views, and in which:

FIG. 1 is a top plan view of a representative embodiment (9) of the "Spatula adapted for Inverting Frying-eggs" of the present invention;

FIG. 2 is a sectional elevational view taken along lines 2—2 of FIGS. 1, 3, and 4;

FIG. 3 is a frontal elevational view as seen along the direction of lines 3—3 of FIGS. 1 and 2;

FIG. 4 is a rearward elevational view as seen along the direction of line 4—4 of FIG. 2; and FIG. 3A, which is analagous to the FIG. 3 frontal view, indicates an alternative embodiment (9A).

DETAILED DESCRIPTION OF THE DRAWING

As seen in drawing FIGS. 1-4, representative embodiment (9) of the herein "Spatula adapted for Inverting Frying-eggs" generally comprises: a multi-perforate lower-plate 10 broadly extending along a horizontal lower-plane 10P having directionally longitudinal lower-edges 11 and 12 flanking a central vertical-plane 9V; an upper-plate 20 broadly extending along a horizontal upper-plane 20P and having upper-edges 21 and 22 flanking said directionally longitudinal vertical-plane 9V; upright plates 30A and 30B respectively connecting lower-edge 11 to upper-edge 21 and lower-edge 12 to upper-edge 22; centrally rearwardly attached to lower-plate 10 and extending directionally longitudinally rearwardly and upwardly therefrom, a handle means (18, 18A) enabling multi-directional (including inversions also) manipulations of the "Spatula" (e.g. 9, 9A); and preferably also, extending outwardly horizontally from a said upright plate, a cutting-blade (35) employable by a homemaker and/or by restaurant or institutional chef for subdividing simultaneously receiveably-cooking frying-eggs.

Spatula-type device embodiments 9 and 9A are centrally bisected by a directionally longitudinal vertical-plane 9V and have a multi-perforate (10A) lower-plate 10 broadly extending along a horizontal lower-plane 10P. Lower-plate 10 has a directionally transverse horizontal (and preferably forwardly convergent) frontal-end 16 and a directionally transverse horizontal rearward-end 17 that is desireably elevated slightly above lower-plane 10P. Spatula-type device embodiments 9 and 9A also have an upper-plate 20 broadly extending along a horizontal upper-plane 20P. Each said upper-plate has a leftward-edge 21 overlying a lower-plate left-edge 11 and a rightward-edge 22 overlying a lower-plate right-edge 12. Connecting said vertically offset upper-plate 20 and lower-plate 10 are upright plates 30A and 30B that are parallel to and flank vertical-plane 9V. Herein, a leftward upright plate 30A connects edges 11 and 21, and a rightward upright plate 30B connects edges 12 and 22. Centrally attached (e.g. by rivet 19) to the lower-plate rearward portion and extending generally directionally longitudinally rearwardly and upwardly from lower-plate 10, is spatula handle means (18-18A). The handle means predominate length 18 is rearwardly-upwardly provided with an enlarged manually-graspable terminal-length 18A which can be perforate (18B) for spatula hanging onto a storing-peg (not shown).

In view of the foregoing, it can be readily appreciated that bottom-side-cooked frying-eggs along frying-plane 10P can be manually scoopably deposited atop lower-plate 10 and thereafter (as indicated by double-headed curved-lines in FIG. 3) manually inverted at handle means 18-18A for re-deposition for top-side cooking upon the frying-grill or frying-pan plane 10P in yokes-intact condition. During this yokes-intact top-side cooking, cutting-blade 35 can be employed for inter-yokes' severance therebetween.

Preferably, the cutting-blade means (e.g. 35) extends single-directionally from the central vertical-plane (9V). Thus, for non-ambidextrous chefs, the cutting-blade (35) needs to be made extendable only unidirectionally from central vertical-plane 9V. In this vein, only one of the upright-plates (30A, 30B) is provided with a said horizontally extending cutting-blade means (35). For example, leftward upright-plate 30A only is provided with a horizontally extending cutting-blade means (35), but both upright-plates (30A, 30B) can be removably selectively attached (at lower-plate grooves 30AA, 30BB) to peripheral locations of the lower-plate (10) upper-side.

From the foregoing, the construction and operation of the "Spatula adapted for Inverting Frying-eggs" will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, as encompassed by the scope of the appended claims.

I claim:

1. Spatula especially adapted for inverting frying-eggs from a horizontal frying-grill, and said spatula comprising:
    (A) a multi-perforate laminar horizontal lower-plate predominately extending along a horizontal lower-plane and having a pair of directionally longitudinal lower-edges flanking a directionally longitudinal central vertical-plane and which lower-edges include a left-edge and a right-edge;
    (B) a laminar horizontal upper-plate predominately extending along a horizontal upper-plane and having a pair of directionally longitudinal upper-edges flanking said central vertical-plane and which upper-edges include a leftward-edge overlying said left-edge and a rightward-edge overlying said right-edge;
    (C) a pair of upright plates flanking said central vertical-plane and including a left-plate connecting said lower-plate to said upper-plate and further including a right-plate connecting said lower-plate to said upper-plate, and said left-plate and right-plate providing the sole connection between said upper-plate and said lower-plate; and
    (D) located generally parallel to said directionally longitudinal central-plane, and attached to, and extending directionally longitudinally, upwardly, and rearwardly from said lower-plate, handle means for said spatula.

2. The spatula of claim 1 wherein the lower-plate includes a horizontal and directionally transverse front-end and also a horizontal and directionally transverse rear-end; wherein the upper-plate includes a horizontal and directionally transverse frontal-end and also a horizontal and directionally transverse rearward-end; and wherein said handle means is topically attached to said lower-plate immediately adjacent to the rear-end thereof.

3. The spatula of claim 2 wherein at least one of said upright plates, in vertical elevation between said lower-plate and said upper-plate, is provided with a directionally transverse and outwardly horizontal cutting-blade employable for sub-dividing a multiplicity of frying-eggs.

4. The spatula of claim 2 wherein the upper-plate, as compared to the condition of the lower-plate, is substantially imperforate.

5. The spatula of claim 2 wherein the lower-plate front-end converges directionally longitudinally forwardly toward said vertical central-plane and extends forwardly beyond said upper-plate frontal-end; and wherein the lower-plate rear-end extends directionally longitudinally rearwardly beyond the position of said upper-plate rearward-end.

6. The spatula of claim 2 wherein the upper-plate is securely removably associated with respect to said lower-plate.

7. The spatula of claim 2 wherein at least one of said upright plates is provided with a directionally transverse and outwardly horizontal cutting-blade employable for sub-dividing frying eggs.

8. The spatula of claim 7 wherein the upper-plate is securely removably associated with respect to said lower-plate.

9. The spatula of claim 8 wherein said left-plate and said right-plate are integrally connected to said upper-plate and wherein said left-plate and right-plate are respectively securely removably connected to the said lower-plate in flanking relationship to said central vertical-plane.

10. Spatula adapted for usage with horizontal frying-grills and comprising:
    (A) a multi-perforate laminar horizontal lower-plate predominately extending along a horizontal lower-plane and having a pair of directionally longitudinal lower-edges flanking a directionally longitudinal central vertical-plane and which lower-edges include a left-edge and a right-edge;
    (B) a laminar horizontal upper-plate predominately extending along a horizontal upper-plane and having a pair of directionally longitudinal upper-edges flanking said central vertical-plane and which upper-edges include a leftward-edge overlying said left-edge and a rightward-edge overlying said right-edge;
    (C) a pair of upright plates flanking said central vertical-plane and including a left-plate connecting said lower-plate to said upper-plate and further including a right-plate connecting said lower-plate to said upper-plate, and at least one of said upright plates being provided with a directionally transverse and outwardly horizontal cutting-blade employable for sub-dividing frying-eggs; and
    (D) located generally parallel to said directionally longitudinal central vertical-plane, and attached to, and extending directionally longitudinally, rearwardly and upwardly from said lower-plate:handle means for said spatula.

11. The spatula of claim 10 wherein the upper-plate is securely removably associated with respect to said lower-plate.

12. The spaula of claim 11 wherein upper extremities of said left-plate and right-plate are integrally connected to said upper-plate; and wherein lower extremities of said left-plate and right-plate are respectively securely removably connected to said lower-plate in flanking relationship to said central vertical-plane.

13. The spatula of claim 12 wherein the lower-plate is provided with directionally longitudinal topical grooves flanking said central vertical-plane ancillary to providing securely removable association between the upright plates and the lower-plate.

* * * * *